2,925,788
Patented Feb. 23, 1960

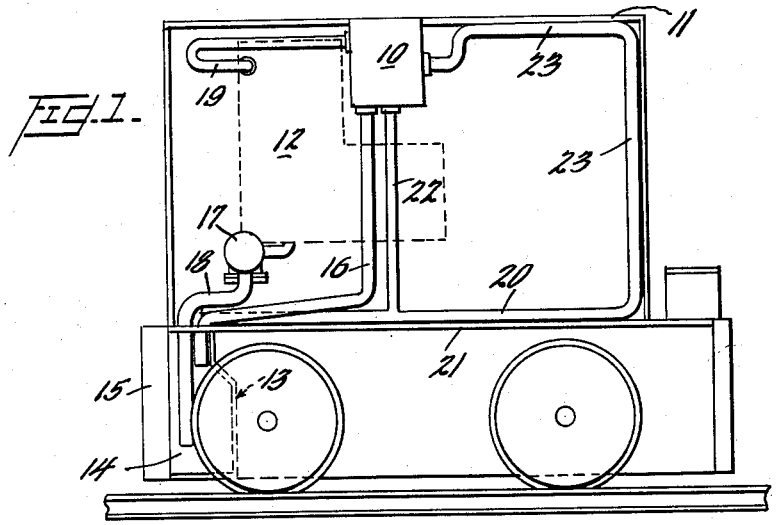
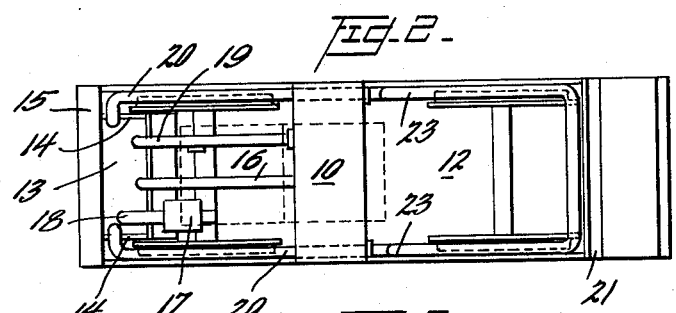
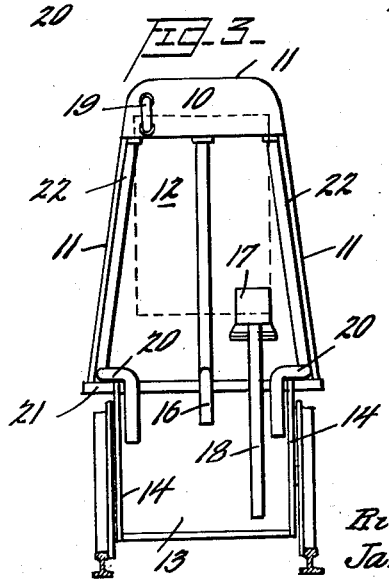
INVENTORS
Richard E. Ketley
James C. Paterson,
BY Watson, Cole, Grindle & Watson
ATTORNEYS

2,925,788
COOLING INTERNAL COMBUSTION LOCOMOTIVE ENGINES

Richard Edmund Ketley and James Craig Paterson, Johannesburg, Transvaal, Union of South Africa Application November 8, 1957, Serial No. 695,460
Claims priority, application Union of South Africa November 12, 1956

3 Claims. (Cl. 105—62)

This invention relates to the cooling of internal combustion engines mounted on or in heavy metal frames, particularly diesel engines on mine locomotives and the invention will be described as applied to such a locomotive.

Internal combustion engines are frequently cooled by water in radiators having a fan to draw air through the radiator to remove the heat from the water therein. The radiator is a delicate piece of apparatus and in a mine particularly is liable to damage.

In some cases the water is evaporated, and with cooling effected in this manner it is difficult to avoid the deposition of scale on and about the cylinder of the engine. Such deposits lead to overheating, and in any case any increase in water vapour in mine atmosphere is very objectionable and every attempt is made to avoid its production.

It is the object of this invention to avoid the above difficulties in cooling internal combustion engines particularly those used in locomotives working in mines.

In accordance with this invention there is provided an internal combustion engine having a circulating liquid cooling system the latter mounted in a frame carrying the engine such that the cooling of the liquid is effected mainly by conduction to the frame.

In accordance with a further feature of this invention the circulating liquid is in direct contact with the frame members of a locomotive.

The accompanying drawing illustrates schematically and in section the application of the invention:

Fig. 1 is a side elevation of the locomotive,
Fig. 2 is a plan view of Fig. 1 and,
Fig. 3 a front view of Fig. 1.

As shown in the drawings there is provided a header tank 10 connected to be in direct contact with the top casing 11 of the locomotive or having one wall formed thereby and is above the engine 12. Three walls of a tank 13 are formed by the two frame plates 14 and the buffer beam 15 said tank 13 forming part of the liquid cooling system of engine 12. The header tank 10 is connected to tank 13 by down pipe 16. Water is drawn from tank 13 through pipe 18 by a pump 17 into engine 12. The discharge of water from the engine 12 to the tank 10 is effected by means of pipe 19.

It will be seen that the engine mounting is in close proximity to the heavy metal members of the locomotive frame whereby part of the heat of the engine is conveyed to the locomotive frame partly by radiation and partly by conduction. The movement of the water or other cooling liquid is however, the main factor in the distribution of the heat throughout the frame of the locomotive whence it is dissipated from a large surface area by radiation. The distribution pipes are secured directly to the frame and transmit a portion of the heat by conduction to the frame. However, the primary cooling function is performed by the tanks which are integral with the frame. The term "frame" should be construed to include the tank structure 14 and 15, the upright members 11 supported on the member 21, the member 11 and the tank 10 which is integral with the member 11. To assist in such distribution pipes 20 are secured directly to the bottom of casing 11 and to the foot plates 21. Pipes 20 are in turn connected through pipes 22 to pipes 23. Pipes 23 are secured directly to the upper part of the casing 11 to enter the header 10. It is to be noted that pipes 22 connect the bottom of header 10 to pipes 23.

It will be understood that the header tank 10 may be made with considerable area and is connected directly to the casing 11 for the dispersal of heat to the ambient air. Instead of water any other suitable liquid could be used. All the pipes such as 20, 22, 23, used for circulating the liquid are lengths of normal water pipes of metal of standard thickness.

In the method of cooling according to this invention no narrow passageways to be clogged by dirty water need be made. The water is only used as a convenient medium for the dispersal of the heat about the heavy metal members of the locomotive frame. Consequently the presence of scale will not be very troublesome and comparatively little moisture will be released into the mine atmosphere. Furthermore there is no radiator or fan to be damaged under rough mining conditions and the water containers and pipes used are robust and not liable to damage.

Should the engine be coupled to the driving wheels of the locomotive through a fluid drive or torque converter the fluid used may take the place of some of the water in the system described and its heat dissipated in a similar manner. In some cases the hot exhaust gases from the engine are passed through channels specially made between girders in the locomotive frame so to effect some cooling before leading the gases to a washing tank.

What we claim as new and desire to secure by Letters Patent is:

1. An internal combustion engine driven locomotive having a circulating liquid cooling system, a frame for the locomotive supporting said cooling system, frame plates and a buffer beam in said frame, conduits and tanks forming part of said cooling system, walls for said tanks, at least one tank having walls formed by said frame plates and buffer beam, and portions of said conduits mounted in direct contact with said frame, whereby the large mass of said frame acts as a radiator and heat sump for said cooling system.

2. An internal combustion engine driven locomotive having a circulating liquid cooling system, a frame for the locomotive supporting said cooling system, a metal casing for the locomotive, conduits and tanks forming part of said cooling system, walls for said tanks, at least one tank being a header tank having a portion of its walls formed by said metal casing, and portions of said conduits mounted in direct contact with said frame, whereby the large mass of said frame acts as a radiator and heat sump for said cooling system.

3. An internal combustion engine driven locomotive having a circulating liquid cooling system, a frame for the locomotive supporting said cooling system, conduits and tanks forming part of said cooling system, walls for said tanks and said conduits, at least part of said walls being formed by said frame, whereby the large mass of said frame acts as a radiator and heat sump for said cooling system.

References Cited in the file of this patent

UNITED STATES PATENTS

| | | |
|---|---|---|
| 385,631 | Kahn | July 3, 1888 |
| 1,503,374 | Parker | July 29, 1924 |
| 2,050,327 | Howard | Aug. 11, 1936 |
| 2,253,676 | Baade | Aug. 26, 1941 |
| 2,260,360 | Barry | Oct. 28, 1941 |
| 2,463,255 | Elliott | Mar. 1, 1949 |
| 2,743,095 | Wright | Apr. 24, 1956 |